Patented Sept. 27, 1932

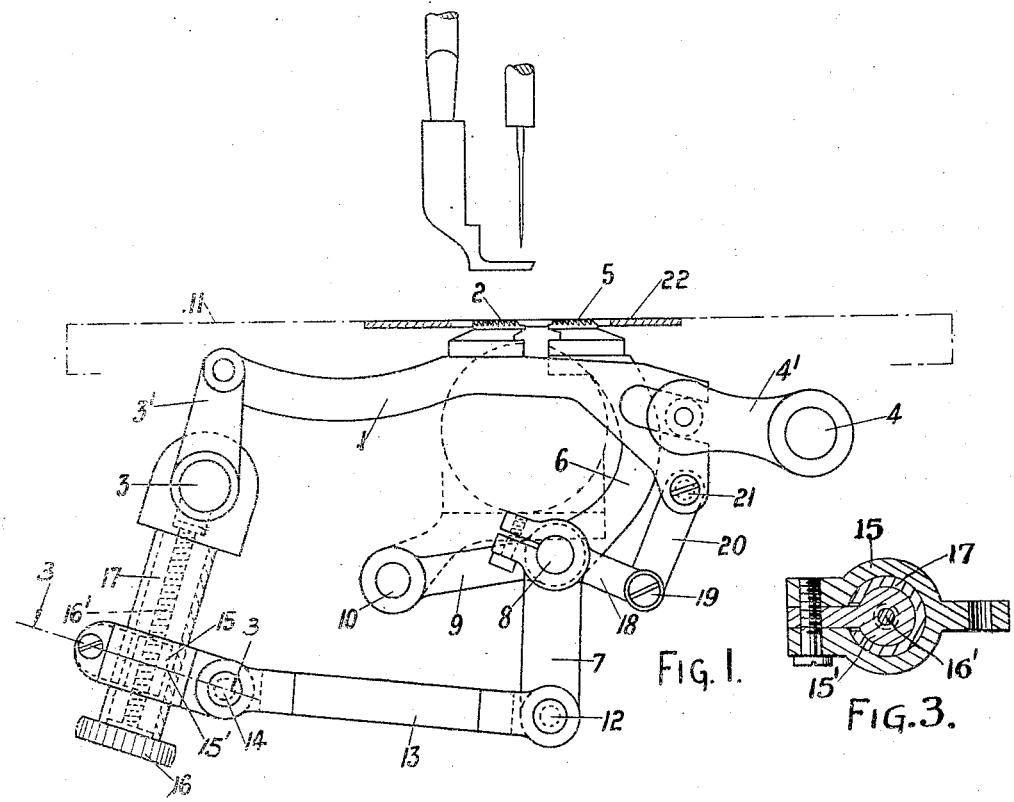
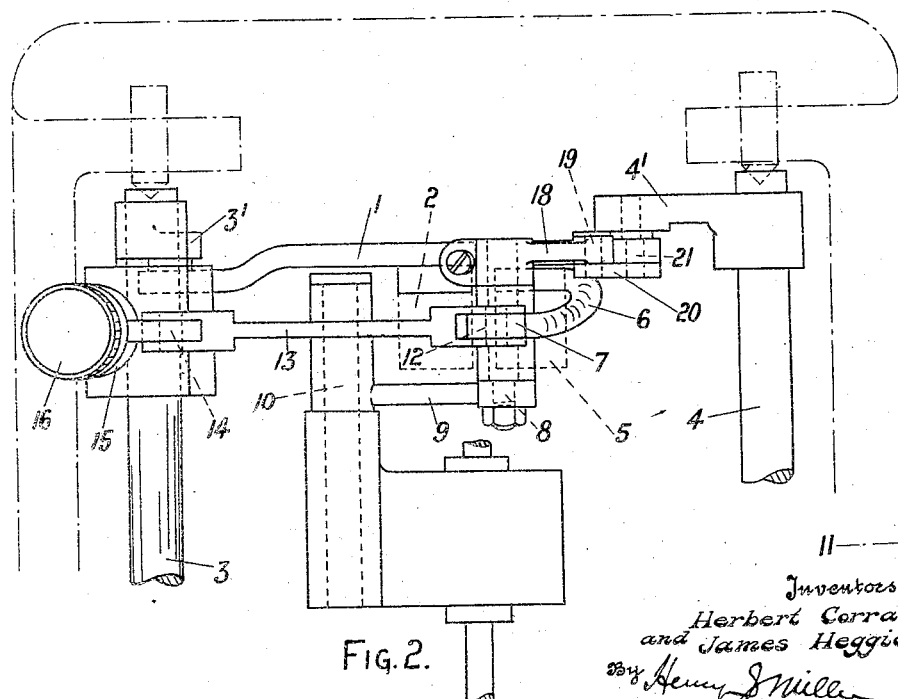

1,879,106

UNITED STATES PATENT OFFICE

HERBERT CORRALL, OF HELENSBURGH, AND JAMES HEGGIE, OF CLYDEBANK, SCOTLAND, ASSIGNORS TO THE SINGER MANUFACTURING COMPANY, OF ELIZABETH, NEW JERSEY, A CORPORATION OF NEW JERSEY

DIFFERENTIAL FEEDING MECHANISM FOR SEWING MACHINES

Application filed April 7, 1931, Serial No. 528,261, and in Great Britain April 9, 1930.

This invention relates to an improved differential feeding mechanism for lock-stitch sewing machines and has for an object to provide an improved arrangement adapted for high-speed machines and offering convenient facilities for adjusting the differential feed and thereby the desired gathering effect.

Mechanism according to the invention includes a feed bar which carries the main feed-dog and to which four-motion movements are given by the usual connections with a feed advance rock shaft and a feed lift rock shaft, and an auxiliary feed dog having operative connections with the feed advance rock shaft and with the main feed bar.

The connections between the auxiliary feed dog and the feed advance rock shaft include a two-armed lever carrying the auxiliary feed dog and having a floating fulcrum carried by an arm that rocks about a fixed fulcrum beneath the bedplate. The end of said two-armed lever remote from the auxiliary feed dog is pivotally connected to one end of a link of which the opposite end is pivoted to a nut-forming collar member adjustable as by manipulation of a milled head along a radial arm depending from the feed advance rock shaft, so that by movement of the collar towards and away from the axis of the feed advance rock shaft the feeding movements of the auxiliary feed dog may be varied. The floating fulcrum of the two-armed lever is constituted by a pin on which is adjustably fixed a short lever to the free end of which is pivotally connected by means of a screw the lower end of a short link the upper end of which is pivotally connected by means of a screw to the main feed bar. By this arrangement the rising and falling movements of the main feed bar are transmitted to the floating fulcrum of the two-armed lever whereby the auxiliary feed dog is given rising and falling movements.

Differential feed mechanism constructed in accordance with the invention is illustrated in the accompanying drawing in which Fig. 1 is an end elevation of the feed mechanism, Fig. 2 a fragmentary inverted plan view, and Fig. 3 is a sectional view on the line 3—3, Fig. 1.

Referring to the drawing, the feed mechanism shown includes a horizontally disposed main feed bar 1 which carries the main feed-dog 2 and to which four-motion movements are imparted through the medium of the rockers or levers 3', 4' by the usual feed advance rock shaft 3 and feed lift rock shaft 4, and an auxiliary feed dog 5 having operative connections with the feed rock shaft 3 and with the main feed bar 1.

The connections between the auxiliary feed dog 5 and the feed rock shaft 3 include a two-armed lever 6, 7 constituting a vertically disposed auxiliary feed-bar of which the arm 6 carries the auxiliary feed dog 5. The lever 6, 7 has a floating fulcrum 8 carried by an arm 9 that rocks about a fixed fulcrum 10 beneath the bedplate 11. The arm 7 of the auxiliary feed-bar or lever 6, 7 is pivotally connected at 12 to one end of a link 13 of which the opposite end is pivoted at 14 to a collar 15 carrying an internal nut 15' adjustable by manipulation of a milled head 16 and screw 16' along a radial arm 17 depending from and fixed to the feed rock shaft 3. It will be seen that by adjustment of the collar 15 radially towards and away from the axis of the feed rock shaft 3 the feeding movements of the auxiliary feed dog 5 may be varied. The floating fulcrum 8 of the two-armed lever is constituted by a pin on which is adjustably fixed a short lever 18 to the free end of which is pivotally connected by means of a pin 19 the lower end of a short link 20 the upper end of which is pivotally connected by means of a pin 21 to the main feed bar 1. By reference to Fig. 1 of the drawing it will be observed that the arm 9 and lever 18, joined at the fulcrum-pin 8, constitute a horizontal feed-lift lever disposed below the main feed-bar 1, and pivotally mounted at one end upon the fixed fulcrum 10, adjacent the feed-advance rock-shaft 3, and with its other end 19 connected by a link 20 with the main feed-bar at 21 from which it receives its rising and falling movements. It will be further observed that the vertically disposed auxiliary feed-bar or lever 6—7 is fulcrumed at 8 between the ends of the feed-lift lever 9—18 and that it receives its work-advancing movements from the link 13 adjustably connected by the collar 15 with the arm 17 depending from the feed-advance rock-shaft 3.

22 denotes the slotted throat plate through which project the feed dogs 2, 5.

What we claim is:—

1. Differential feed mechanism for sewing machines, comprising a feed advance rock shaft, a feed lift rock shaft, a four motion feed-bar having operative connections with said said shafts, a main feed-dog carried by said feed-bar, an auxiliary feed dog, a two-armed lever carrying said auxiliary feed-dog, an adjustable operative connection between said lever and said feed advance rock shaft, and a floating fulcrum for said lever connected to participate in rising and falling movements of said main feed bar.

2. Differential feed mechanism for sewing machines, comprising a feed advance rock shaft, a feed lift rock shaft, a member carried by and adjustable radially of said feed advance rock shaft, a feed-bar having operative connections with said shafts, a main feed-dog carried by said feed-bar, an auxiliary feed dog, a two-armed lever carrying said auxiliary feed-dog, a link connection between said lever and said adjustable member, and a floating fulcrum for said lever connected to participate in rising and falling movements of said feed bar.

3. Differential feed mechanism for sewing machines, comprising a feed advance rock shaft, a feed lift rock shaft, a feed-bar having operative connections with said shafts, a main feed-dog carried by said feed-bar, an auxiliary feed dog, a two-armed lever carrying said auxiliary feed-dog, an adjustable operative connection between said lever and said feed advance rock shaft, a pin constituting a floating fulcrum for said lever, an arm having a fixed pivot carrying said pin, a lever fixed to said pin, and a link connecting said last mentioned lever with said feed-bar.

4. A feeding mechanism for sewing machines, comprising a feed-bar carrying a main feed-dog, rock-shafts for imparting feed-advance and rising-and-falling movements to said main feed-bar, a vertically disposed feed-bar carrying an auxiliary feed-dog, a connection between said main and said vertically disposed feed-bars for imparting rising and falling movements to the latter, and a connection between said vertically disposed feed-bar and one of said rock-shafts for imparting work-advancing movements to said auxiliary feed-dog.

5. A differential feeding mechanism for sewing machines including in combination a feed-advance rock-shaft, a feed-rocker rising therefrom, a horizontally disposed main feed-bar fulcrumed at one end to said feed-rocker, a main feed-dog mounted upon said main feed-bar, means for lifting the main feed-bar, a horizontal auxiliary feed-lift lever, a fixed fulcrum for one end of said lever, an auxiliary feed-bar fulcrumed upon and between the ends of said auxiliary feed-lift lever, a feed-dog carried by said auxiliary feed-bar, means for connecting together the main feed-bar and auxiliary feed-lift lever, and means for imparting work-advancing movements to said auxiliary feed-bar.

In testimony whereof we have signed our names to this specification.

HERBERT CORRALL.
JAMES HEGGIE.